United States Patent [19]
Araki et al.

[11] Patent Number: 6,022,923
[45] Date of Patent: Feb. 8, 2000

[54] PNEUMATIC TIRES

[75] Inventors: Shunji Araki; Kazuhiro Yanagisawa, both of Kodaira, Japan

[73] Assignee: Bridgestone Corporation, Tokyo, Japan

[21] Appl. No.: 08/919,259

[22] Filed: Aug. 28, 1997

Related U.S. Application Data

[63] Continuation-in-part of application No. 08/585,414, Jan. 11, 1996.

[30] Foreign Application Priority Data

Jan. 13, 1995 [JP] Japan ......................................... 7-4505

[51] Int. Cl.[7] .............................. C08K 3/34; B60C 11/00
[52] U.S. Cl. ......................... 524/494; 524/265; 524/261; 524/263; 524/264; 524/492; 524/493; 524/495; 524/496; 524/860; 524/863; 524/864; 152/209 R
[58] Field of Search ..................................... 524/265, 261, 524/263, 264, 492, 493, 495, 496, 494, 868, 863, 864; 152/209 R

[56] References Cited

U.S. PATENT DOCUMENTS

| | | | |
|---|---|---|---|
| 3,768,537 | 10/1973 | Hess et al. | 152/330 |
| 4,229,333 | 10/1980 | Wolff et al. | 260/23.7 |
| 4,704,425 | 11/1987 | Lagarde et al. | 524/492 |
| 5,508,919 | 12/1996 | Agostini et al. | 524/493 |
| 5,543,462 | 8/1996 | Okada et al. | 525/212 |

FOREIGN PATENT DOCUMENTS

| | | |
|---|---|---|
| 0447066 | 9/1991 | European Pat. Off. . |
| 580370 | 1/1994 | European Pat. Off. . |
| 63-2886 | 1/1988 | Japan . |
| 3-252431 | 11/1991 | Japan . |
| 5-51484 | 3/1993 | Japan . |
| 6157825 | 6/1994 | Japan . |

OTHER PUBLICATIONS

Nipsil Technical Bulletin, Nov. 1991.
Aerosil® catalog.
Patent Abstracts of Japan, JP 6248116, vol. 18, No. 639, Jun. 9, 1994.
I. Skeist, *Handbook of Adhesives*, 2nd Ed. 1977, p. 649–651.
WPI/Derwent AN 93–112843 [14]/JP 5051484, Mar. 2, 1993 (2 pages).

*Primary Examiner*—James J. Seidleck
*Assistant Examiner*—Olga Asinovsky
*Attorney, Agent, or Firm*—Sughrue, Mion, Zinn, Macpeak & Seas, PLLC

[57] ABSTRACT

A pneumatic tire having improved rolling resistance and wear resistance comprises a tread made from a rubber composition containing a partially hydrophobizated silica subjected to a surface treatment with an organosilicon compound so as to have specified hydrophobization ratio and apparent density.

6 Claims, No Drawings

PNEUMATIC TIRES

This is a continuation-in-part of the co-pending application Ser. No. 08/585,414 filed Jan. 11, 1996.

BACKGROUND OF THE INVENTION

1. Field of the Invention

This invention relates to pneumatic tires, and more particularly to a pneumatic tire simultaneously establishing the excellent wear resistance and the low rolling resistance.

2. Description of the Related Art

Carbon black is used as a filler for the re-inforcement of rubber articles from the old time because the carbon black has high reinforcing property and wear resistance as compared with the other fillers. At the same time, it is recently demanded to reduce heat build-up of compound rubber in order to save fuel consumption of an automobile under social demand of energy-saving and resource-saving.

If it is intended to reduce the heat build-up of the compound rubber by the carbon black, it is considered to fill a small amount of carbon black or use carbon black having a large particle size. Even in this case, it is known that the reduction of heat build-up is conflicting with the reinforcing property and the wear resistance.

On the other hand, silica is known as another reinforcing filler for the reduction of heat build-up in the compound rubber and is reported in many patents such as JP-A-3-252431 and the like up to the present.

However, the silica tends to form aggregate of particles through hydrogen bond of silanol group as a surface functional group, so that it is necessary to prolong the kneading time for improving the dispersion of silica particles into rubber. When the dispersion of silica particles into rubber is insufficient, the Mooney viscosity of the compound rubber becomes high and the processability such as extrusion or the like is poor.

Since the surface of the silica particle is acidic, it adsorbs a basic substance used as a vulcanization accelerator in the vulcanization of a rubber composition, and hence the vulcanization is not sufficiently conducted and the modulus of elasticity of the vulcanized rubber is not raised.

In order to solve these problems, a silane coupling agent is developed, but the dispersion of silica is not yet reached to a sufficient level, and particularly it is difficult to industrially obtain the good dispersion of the silica in the rubber.

In JP-A-5-51484 is disclosed the use of a silylating agent for improving the dispersion of silica. In this case, silica should be reacted with the silylating agent for a short time during the kneading, so that the reaction efficiency is not sufficient. Further, the silylating agent is low in the boiling point and evaporates in the kneading, so that the reaction is not sufficiently conducted.

In JP-B-63-2886 and JP-A-6-157825 is disclosed the use of a hydrophobic precipitated silica. Since the precipitated silica is subjected to a complete hydrophobization treatment, the silanol group to be reacted with the silane coupling agent is not existent on the surface of the silica at all, so that the reinforcement of rubber is not sufficiently attained.

SUMMARY OF THE INVENTION

It is, therefore, an object of the invention to solve the aforementioned problems of the conventional techniques and to provide pneumatic tires having improved wear resistance and low rolling resistance by improving the dispersion of silica into tread rubber.

The inventors have made various studies with respect to the dispersion of silica into rubber and found that the wear resistance and low rolling resistance of the tire can simultaneously be established by using a rubber composition containing a partially hydrophobizated silica in a tread rubber and as a result the invention has been accomplished.

According to the invention, there is the provision of a pneumatic tire comprising a tread, said tread being made from a rubber composition comprising 10–85 parts by weight of a partially hydrophobizated silica obtained by subjecting a precipitated silica to a surface treatment with an organosilicon compound so as to satisfy a hydrophobization ratio (A) of 15–65% represented by the following equation and an apparent density of 200–350 g/l, based on 100 parts by weight of natural rubber and/or synthetic diene rubber:

$$A = 100 - (DBA/DBA') \times 100$$

wherein DBA is a di-n-butylamine adsorption of silica after surface treatment and DBA' is a di-n-butylamine adsorption of silica before surface treatment.

DESCRIPTION OF PREFERRED EMBODIMENTS

The rubber ingredient used in the rubber composition for tire tread according to the invention is natural rubber and/or synthetic diene rubber.

As the synthetic diene rubber, mention may be made of synthetic polyisoprene rubber, polybutadiene rubber, styrene-butadiene copolymer rubber and the like.

These rubber ingredients may be used alone or in admixture.

The partially hydrophobizated silica used in the rubber composition according to the invention has a hydrophobization ratio of 15–65%, preferably 30–60% and an apparent density of 200–350 g/l. When the hydrophobization ratio is less than 15%, it is difficult to obtain a sufficient wear resistance, while when it exceeds 65%, the effect of sufficiently improving the dispersion of the silica into rubber is not obtained and the wear resistance and low rolling resistance are not improved. Further, when the apparent density is less than 200 g/l, the kneading processability of rubber is poor, while when it exceeds 350 g/l, silica pellets becomes too hard and the dispersion failure is caused.

In such a silica, the di-n-butylamine (DBA) adsorption after the surface treatment is preferably within a range of 100–230 mmol/kg. When the DBA adsorption is less than 100 mmol/kg, the sufficient reinforcing property can not be maintained and the wear resistance is insufficient, while when it exceeds 230 mmol/kg, the viscosity of the rubber composition does not lower to a satisfactory level and hence the dispersion of silica becomes poor to deteriorate the wear resistance.

The amount of the partially hydrophobizated silica used in the rubber composition according to the invention is 10–85 parts by weight based on 100 parts by weight of the rubber ingredient. When the amount is less than 10 parts by weight, the effect of improving the wear resistance and rolling resistance by the dispersion of silica is less, while when it exceeds 85 parts by weight, the degradation of processability in a roll burgy or the like is caused.

The organosilicon compound used for the surface treatment of the partially hydrophobizated silica is at least one substance selected from the group consisting of compounds represented by the following general formulae (1)–(5) and low molecular weight cyclic polysiloxane:

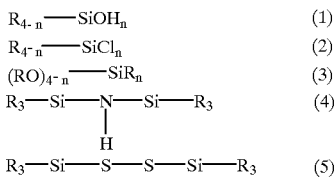

$$R_{4-n}\text{—SiOH}_n \quad (1)$$
$$R_{4-n}\text{—SiCl}_n \quad (2)$$
$$(RO)_{4-n}\text{—SiR}_n \quad (3)$$
$$R_3\text{—Si—N—Si—R}_3 \quad (4)$$
$$\quad\quad\quad\quad |$$
$$\quad\quad\quad\quad H$$
$$R_3\text{—Si—S—S—Si—R}_3 \quad (5)$$

wherein n is an integer of 1–3, and R is a straight or branched chain, saturated or unsaturated, aromatic or alicyclic hydrocarbon group.

As the organosilicon compound, mention may be made of trimethyl silanol, trimethylmonochloro silane, dimethyldimethoxy silane, diphenyldimethoxy silane, hexamethyl disilazane, hexamethyl disilthian and the like.

In the formation of the partially hydrophobizated silica according to the invention, the method of treating the surface of the silica with the organo-silicon compound is not particularly restricted, but the use of a high-speed flowing mixer such as Henschel mixer or the like is favorable because the uniformity in the treatment is easily obtained.

The amount of the organosilicon compound used in the surface treatment of the silica is adjusted so as to provide a desired hydrophobization ratio in accordance with the kinds of silica and organosilicon compound used. The water content contained in the silica during the treatment is preferable to be adequate (about 3–10%) because the organosilicon compound has a functional group for hydrolysis. After the surface treatment, the silica may be subjected to a heating treatment.

According to the invention, the number of silanol groups existing on the surface of the silica is adequately decreased without changing the particle size by partially hydrophobizing the silica surface with the organosilicon compound at a particular hydrophobization ratio, whereby the agglomeration of silica due to hydrogen bond of such silanol group is controlled to improve the dispersion of silica into rubber, while the proper number of silanol groups is retained on the silica surface to ensure the reinforcing property to rubber to a certain extent. Thus, the wear resistance and low heat build-up of the rubber composition, which are conflicting with each other, and hence the wear resistance and low rolling resistance of the tire can simultaneously be established.

Moreover, DBA adsorption is a measure for indicating the degree of hydrophobization in the silica. Adsorption is caused by ion bond between amino group in molecule of DBA and silanol group existing on the silica surface. The large adsorption shows that the hydrophobization is not so conducted or the number of silanol groups in the silica surface is large, while the small adsorption shows that the hydrophobization is promoted.

According to the invention, carbon black may be used as a reinforcing filler, if necessary. The kind of carbon black used is not particularly restricted, but carbon black SAF, HAF or the like may favorably be used. In any case, the carbon black is preferable to have a dibutylphthalate (DBP) oil absorption (ml/100 g) satisfying the following equation:

$$\text{DBP oil absorption} \geq 0.19 \times N_2SA + 90$$

wherein $N_2SA$ is a specific surface area (m$^2$/g) of nitrogen adsorption of carbon black. Moreover, an absolute value of $N_2SA$ is applied to this equation. When carbon black satisfies the relation between DBP and $N_2SA$ represented by the above equation, the effect of improving the wear resistance and low rolling resistance by the addition of the silica according to the invention can be developed at maximum.

The amount of carbon black used is preferably not more than 80 parts by weight per 100 parts by weight of the rubber ingredient. If the amount exceeds 80 parts by weight, the rolling resistance becomes high and the poor dispersion is caused to degrade the wear resistance.

When the silica is used together with the carbon black, it is favorable that a compounding ratio of silica to carbon black is within a range of 90/10–10/90, preferably 80/20–20/80. If the compounding ratio of the silica is low, the effect of improving the low rolling resistance may not sufficiently obtained, while when it is too high, the rolling resistance is improved but the wear resistance may be poor in practical use.

In the invention, a silane coupling agent is preferably used for coupling a silanol group remaining on the surface of the partially hydrophobizated silica to the rubber ingredient to form a reinforcing layer.

The amount of the silane coupling agent used is preferably within a range of 1–15% by weight based on the weight of silica. When the amount is less than 1% by weight, the sufficient coupling effect is not obtained, while when it exceeds 15% by weight, the gelation of the rubber ingredient may be caused.

As the silane coupling agent used in the invention, use may be made of compounds usually used in the rubber field without restriction, but it is preferable to use at least one compound selected from the compounds represented by the following general formulae (6)–(9)

$$[(RO)_3SiC_nH_{2n}]_2S_m \quad (6)$$
$$(RO)_3SiC_nH_{2n}X \quad (7)$$
$$(RO)_3Si\text{—}C_nH_{2n}\text{—}S_4\text{—}\overset{\overset{\displaystyle S}{\|}}{C}N(CH_3)_2 \quad (8)$$

$$(RO)_3Si\text{—}C_nH_{2n}\text{—}S_4\text{—benzothiazyl} \quad (9)$$

wherein R is an alkyl group having a carbon number of 1–3, n is an integer of 1–8, m is an integer of 1–6, and X is a mercapto group or an amino group.

There are concretely mentioned bis(3-trimethylsilylpropyl) tetrasulfide, α-mercaptopropyl triethoxysilane, α-aminopropyl triethoxysilane, N-phenyl-α-aminopropyl trimethoxysilane, N-β-(aminoethyl)-γ-aminopropyl trimethoxysilane, 3-trimethoxysilylpropyl-N, N-dimethylthiocarbamoyl tetrasulfide and 2-benzothiazyl-3-trimethoxysilylpropyl tetrasulfide.

The rubber composition according to the invention may be compounded with proper amounts of various additives usually used in the rubber field such as other reinforcing filler, vulcanizing agent, vulcanization accelerator, antioxidant, softening agent and the like, if necessary.

By using the rubber composition according to the invention in the tread can be provided pneumatic tires having balancedly improved wear resistance and rolling resistance.

The following examples are given in illustration of the invention and are not intended as limitations thereof. In the examples, part and % are by weight otherwise specified.

Various tests are carried out after a pneumatic radial tire for passenger car having a tire size of 185/70R13 is prepared according to usual manner.

The measurement of properties is made as follows:
1) DBA adsorption

It is measured according to R. Meyer: Kautschuku Gummi., 7(8), 180–182 (1954). That is, the partially hydrophobizated silica particles are dried at 105° C. for 2 hours and weighed to obtain 250 mg of a sample. This sample is added with 50 ml of 1/500 normal DBA petroleum benzine solution and left to stand at 20° C. for 2 hours. Then, 25 ml of a supernatant liquid is taken out and added with 5 ml of chloroform and 2–3 droplets of a crystal violet indicator, which is titrated with an acetic anhydride solution of 1/100 normal perchloric acid. A titrated value when color changes from violet to blue is A ml. Separately, a titrated value in blank test containing no sample is B ml. DBA adsorption is calculated according to the following equation:

$$DBA\ adsorption\ (mmol/kg) = 80(B-A) \times f$$

wherein f is a potency of 1/100 normal perchloric acid solution.

2) Nitrogen adsorption

It is measured according to a method B described in ASTM D-3037-84.

tire is actually run on road over a given distance and then remaining groove depth is measured at 10 places to determine an average value:

$$Wear\ resistance\ index = D'/D \times 100$$

wherein D is an average value of remaining groove depth of control tire and D' is an average value of remaining groove depth of test tire. The larger the index value, the better the wear resistance.

Preparation of partially hydrophobizated silica

A commercially available precipitated silica is mixed with a necessary amount of a treating agent as an organosilicon compound in Henschel mixer for 7 minutes and hot-dried at 150° C. for 30 minutes to obtain given silica to be used in the examples. The kind of commercially available product used, kind of treating agent and properties of resulting silica are shown in Table 1.

TABLE 1

|  | Sample 1 | Sample 2 | Sample 3 | Sample 4 | Sample 5 | Sample 6 |
| --- | --- | --- | --- | --- | --- | --- |
| Silica *1 | Nipsil AQ | Nipsil AQ | Nipsil AQ | Nipsil AQ | Nipsil AQ | Nipsil AQ |
| Treating agent *2 | — | hexamethyl disilazane | dimethyl dimethoxysilane | trimethyl monochlorosilane | hexamethyl disilazane | hexamethyl disilazane |
| Amount of treating agent (g/100 g silica) | 0 | 3 | 5 | 7 | 0.5 | 12 |
| DBA adsorption (mmol/kg) | 286 | 174 | 180 | 171 | 246 | 94 |
| A *3 | — | 39 | 37 | 40 | 14 | 67 |
| Apparent density (g/l) | 268 | 248 | 250 | 246 | 253 | 236 |

*1: made by Nippon Silica Kogyo K.K.
*2: made by The Shin-Etsu Chemical Co., Ltd.

$$*3: A\ (hydrophobization\ ratio) = 100 - \frac{DBA\ after\ treatment}{DBA\ before\ treatment} \times 100$$

3) DBP oil absorption

It is measured according to a method A described in item 6.1.2 of JIS K6221.

4) Rolling resistance

The rolling resistance index indicating the rolling resistance is calculated according to the following equation after the tire is run on a drum of 1.7 m in outer diameter rotating at a certain speed and the rotation of the drum is stopped to measure inertia moment of the tire decreased to a certain speed:

$$Rolling\ resistance\ index = M/M' \times 100$$

wherein M is inertia moment of control tire and M' is inertia moment of test tire. The larger the index value, the lower the rolling resistance.

5) Wear resistance

The wear resistance index indicating the wear resistance is calculated according to the following equation after the The properties of carbon blacks used in the examples are shown in Table 2.

TABLE 2

| Carbon black *1 | Seast 3 | Seast 3H | Seast 500 | Seast 6 | Seast 9 | Seast 9H |
| --- | --- | --- | --- | --- | --- | --- |
| Specific surface area of nitrogen adsorption ($N_2SA$) ($m^2/g$) | 79 | 82 | 106 | 117 | 142 | 142 |
| DBP oil absorption (ml/100 g) | 101 | 126 | 75 | 115 | 115 | 130 |
| $0.19 \times (N_2SA) + 90$ | 105 | 106 | 110 | 112 | 117 | 117 |

*1: made by Tokai Carbon Co., Ltd.

EXAMPLES 1–13, COMPARATIVE EXAMPLES 1–4

A rubber composition is prepared according to a compounding recipe shown in Table 3 and is used in a tread of the tire. The properties of the tire are also shown in Table 3.

TABLE 3(a)

|  |  | Comparative Example 1 | Example 1 | Example 2 | Example 3 | Comparative Example 2 | Comparative Example 3 | Example 4 | Comparative Example 4 |
|---|---|---|---|---|---|---|---|---|---|
| Rubber ingredient | BR01 *1 | — | — | — | — | — | — | — | — |
|  | SBR1500 *1 | 65 | 65 | 65 | 65 | 65 | 65 | 65 | 65 |
|  | NR | 35 | 35 | 35 | 35 | 35 | 35 | 35 | 35 |
| Silica | Sample No. | 1 | 2 | 3 | 4 | 5 | 6 | 2 | 2 |
|  | Compounding amount | 60 | 60 | 60 | 60 | 60 | 60 | 80 | 90 |
| Carbon black *2 | Kind: Seast | — | — | — | — | — | — | — | — |
|  | Compounding amount | — | — | — | — | — | — | — | — |
| Compunding amount of coupling agent | Si69 *3 | 6 | — | — | — | — | — | — | — |
|  | KBM803 *4 | — | 1.2 | 1.2 | 1.2 | 1.2 | 1.2 | 1.6 | 1.8 |
| Zinc oxide |  | 3 | 3 | 3 | 3 | 3 | 3 | 3 | 3 |
| Antioxidant *5 |  | 1 | 1 | 1 | 1 | 1 | 1 | 1 | 1 |
| Vulcanization Accelerator *6 |  | 1.5 | 1.5 | 1.5 | 1.5 | 1.5 | 1.5 | 1.5 | 1.5 |
| Sulfur |  | 1.5 | 1.5 | 1.5 | 1.5 | 1.5 | 1.5 | 1.5 | 1.5 |
| Rolling resistance (index) |  | 100 | 106 | 105 | 105 | 102 | 104 | 101 | 95 |
| Wear resistance (index) |  | 100 | 109 | 106 | 105 | 97 | 93 | 117 | 123 |

*1: made by Japan Synthetic Rubber Co., Ltd.
*2: made by Tokai Carbon Co., Ltd., see Table 2
*3: made by Degussa in Germany bis-(3-trimethoxysilylpropyl)tetrasulfide
*4: made by The Shin-Etsu Chemical Co., Ltd. γ-mercaptopropyl trimethoxysilane
*5: N-phenyl-N'-isopropyl-P-phenylenediamine
*6: N-oxydiethylene-2-benzothiazole sulfenamide TABLE 3(b)

|  |  | Example 5 | Example 6 | Example 7 | Example 8 | Example 9 | Example 10 | Example 11 | Example 12 | Example 13 |
|---|---|---|---|---|---|---|---|---|---|---|
| Rubber ingredient | BR01 *1 | — | 20 | — | — | — | — | — | — | — |
|  | SBR1500 *1 | 65 | 45 | 40 | 65 | 65 | 65 | 65 | 65 | 65 |
|  | NR | 35 | 35 | 60 | 35 | 35 | 35 | 35 | 35 | 35 |
| Silica | Sample No. | 2 | 2 | 2 | 2 | 2 | 2 | 2 | 2 | 2 |
|  | Compounding amount | 60 | 60 | 60 | 25 | 25 | 25 | 25 | 25 | 25 |
| Carbon black *2 | Kind: Seast | — | — | — | 3H | 3 | 6 | 600 | 9H | 9 |
|  | Compounding amount | — | — | — | 25 | 25 | 25 | 25 | 15 | 15 |
| Compunding amount of coupling agent | Si69 *3 | 3 | — | — | — | — | — | — | — | — |
|  | KBM803 *4 | — | 1.2 | 1.2 | 0.5 | 0.5 | 0.5 | 0.5 | 0.5 | 0.5 |
| Zinc oxide |  | 3 | 3 | 3 | 3 | 3 | 3 | 3 | 3 | 3 |
| Antioxidant *5 |  | 1 | 1 | 1 | 1 | 1 | 1 | 1 | 1 | 1 |
| Vulcanization Accelerator *6 |  | 1.5 | 1.5 | 1.5 | 1.5 | 1.5 | 1.5 | 1.5 | 1.5 | 1.5 |
| Sulfur |  | 1.5 | 1.5 | 1.5 | 1.5 | 1.5 | 1.5 | 1.5 | 1.5 | 1.5 |
| Rolling resistance (index) |  | 105 | 109 | 108 | 104 | 103 | 102 | 104 | 103 | 104 |
| Wear resistance (index) |  | 107 | 118 | 109 | 115 | 104 | 109 | 101 | 110 | 103 |

*1: made by Japan Synthetic Rubber Co., Ltd.
*2: made by Tokai Carbon Co., Ltd., see Table 2
*3: made by Degussa in Germany bis-(3-trimethoxysilylpropyl)tetrasulfide
*4: made by The Shin-Etsu Chemical Co., Ltd. y-mercaptopropyl trimethoxysilane
*5: N-phenyl-N'-isopropyl-P-phenylenediamine
*6: N-oxydiethylene-2-benzothiazole sulfenamide In Table 3, the pneumatic tire having the tread rubber made from a rubber composition containing commercially available silica is shown in Comparative Example 1. When Examples 1–3 are compared with Comparative Example 1, it can be seen that the low rolling resistance and wear resistance can simultaneously established in the pneumatic tires according to the invention. Further, as seen from the comparison between Example 5 and Comparative Example 1, when the rubber composition containing the partially hydrophobizated precipitated silica is used in the tread, even if the amount of the silane coupling agent used is decreased, the resulting tire exhibits good wear resistance and low rolling resistance.

Comparative Example 2 shows a pneumatic tire having the tread made from the rubber composition containing the partially hydrophobizated silica with a hydrophobization ratio A smaller than the lower limit defined in the invention, and is poor in the wear resistance as compared with Examples 1–3. Although the cause is not clear, it is presumed that there is a synergistic effect between the hydrophobizated silica and the silane coupling agent. That is, when the hydrophobization ratio is too small, the modulus of elasticity tends to be decreased, and consequently the wear resistance of the tire is degraded though the partially hydrophobizated silica is used.

Comparative Example 3 shows a pneumatic tire having the tread made from the rubber composition containing the partially hydrophobizated silica with a hydrophobization ratio A larger than the upper limit defined in the invention, in which the rolling resistance is good but the wear resistance is considerably degraded as compared with Examples 1–3. This is considered due to the fact that since the hydrophobization on the silica surface is extremely promoted, the number of silanol groups existing on the silica surface is very small or zero and hence the reinforcement through the interaction with the rubber ingredient is not obtained.

Even when the composition of synthetic diene rubbers in the rubber composition is changed as shown in Examples 6 and 7, the rolling resistance and the wear resistance are improved.

recipe as shown in Table 4. Then, each of these rubber compositions is used as a tread rubber to prepare a pneumatic radial tire for passenger car having a tire size of 185/70R13.

Thereafter, the rolling resistance and wear resistance are evaluated by the same methods as in Example 1 with respect to these tires to obtain results as shown in Table 4, in which the rolling resistance and the wear resistance are represented by an index on the basis that Comparative Example 1 is 100. The larger the index value, the better the property. Moreover, silica used in each of Examples 14–16 is prepared by subjecting to Nipsil AQ to a surface treatment with hexamethyl disilazane in the same manner as in Example 1.

TABLE 4

|  | Comparative Example 1 | Example 14 | Example 15 | Example 16 | Comparative Example 5 | Comparative Example 6 | Comparative Example 7 | Comparative Example 8 |
|---|---|---|---|---|---|---|---|---|
| Silica | Nipsil AQ *1 | Nipsil AQ | Nipsil AQ | Nipsil AQ | Aerosil *2 R812S | Aerosil *2 R812 | Aerosil *2 R972 | Aerosil *2 OX50 |
| Treating agent |  | hexamethyl disilazane |  |  | — | — | — | — |
| Amount of treating agent (g/100 g silica) | 0 | 1 | 10 | 20 | — | — | — | — |
| DBA adsorption (mmol/kg) | 286 | 237 | 103 | 69 | — | — | — | — |
| A *3 | — | 17 | 64 | 76 | — | — | — | — |
| Apparent density (g/l) | — | 246 | 245 | 240 | about 50 | about 50 | about 50 | about 130 |
| SBR1500 *4 | 65 | 65 | 65 | 65 | 65 | 65 | 65 | 65 |
| NR | 35 | 35 | 35 | 35 | 35 | 35 | 35 | 35 |
| Compounding amount of silica | 60 | 60 | 60 | 60 | 60 | 60 | 60 | 60 |
| Coupling agent Si69 *5 | 6 | — | — | — | — | — | — | — |
| Coupling agent KBM803 *6 | — | 1.2 | 1.2 | 1.2 | 1.2 | 1.2 | 1.2 | 1.2 |
| Zinc oxide | 3 | 3 | 3 | 3 | 3 | 3 | 3 | 3 |
| Antioxidant *7 | 1 | 1 | 1 | 1 | 1 | 1 | 1 | 1 |
| Vulcanization accelerator *8 | 1.5 | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 | 1.5 |
| Rolling resistance (index) | 100 | 103 | 105 | 98 | 110 | 109 | 112 | 115 |
| Wear resistance (index) | 100 | 102 | 102 | 87 | 61 | 64 | 54 | 47 |

*1: made by Nippon Silica Kogyo K.K.
*2: surface treated silica made by Nippon Aerosil Co., Ltd.
*3: A (hydrophobization ratio) = $100 - \dfrac{\text{DBA after treatment}}{\text{DBA before treatment}} \times 100$
*4: made by Japan Synthetic Rubber Co., Ltd.
*5: made by Degussa in Germany bis-(3-trimethoxysilylpropyl)tetrasulfide
*6: made by The Shin-Etsu Chemical Co., Ltd. γ-mercaptopropyl trimethoxysilane
*7: N-phenyl-N'-isopropyl-p-phenylenediamine
*8: N-oxydiethylene-2-benzothiazole sulfenamide Even when the rubber composition using carbon black having a higher DBP oil absorption to $N_2SA$ in addition to the partially hydrophobizated silica is used in the tread as in Examples 8–13, the wear resistance and the rolling resistance are improved.

EXAMPLES 14–16, COMPARATIVE EXAMPLES 5–8

There are provided seven rubber compositions using Nipsil AQ or Aerozil product according to a compounding

EXAMPLES 17–31, COMPARATIVE EXAMPLES 9–18

The same procedure as described in Example 14 is repeated except that five kinds of silica shown in Tables 5–9 are used as the precipitated silica instead of Nipsil AQ and the hydrophobization ratio (A) is changed by varying the amount of hexamethyl disilazane as a treating agent. As seen from the results of Tables 5–9, the wear resistance is degraded when the hydrophobization ratio does not satisfy the range of 15–65% defined in the invention irrespectively of the kind of the precipitated silica.

TABLE 5

|  | Comparative Example 1 | Comparative Example 9 | Example 17 | Example 18 | Example 19 | Comparative Example 10 |
|---|---|---|---|---|---|---|
| Silica | Nipsil AQ*1 | Hi-Sil 243LD *2 | Hi-Sil 243LD *2 | Hi-Sil 243LD *2 | Hi-Sil 243LD *2 | Hi-Sil 243LD *2 |
| Treating agent |  |  | hexamethyl disilazane |  |  |  |
| Amount of treating agent (g/100 g silica) | 0 | 0.5 | 1 | 3 | 10 | 12 |
| DBA adsorption (mmol/kg) | 286 | 257 | 248 | 177 | 109 | 94 |
| A *3 | — | 13 | 16 | 38 | 63 | 68 |
| Apparent density (g/l) | 268 | 298 | 285 | 282 | 275 | 272 |
| SBR1500 *4 | 65 | 65 | 65 | 65 | 65 | 65 |
| NR | 35 | 35 | 35 | 35 | 35 | 35 |
| Compounding amount of silica | 60 | 60 | 60 | 60 | 60 | 60 |
| Coupling agent Si69 *5 | 6 | — | — | — | — | — |
| Coupling agent KBM803 *6 | — | 1.2 | 1.2 | 1.2 | 1.2 | 1.2 |
| Zinc oxide | 3 | 3 | 3 | 3 | 3 | 3 |
| Antioxidant *7 | 1 | 1 | 1 | 1 | 1 | 1 |
| Vulcanization accelerator *8 | 1.5 | 1.5 | 1.5 | 1.5 | 1.5 | 1.5 |
| Sulfur | 1.5 | 1.5 | 1.5 | 1.5 | 1.5 | 1.5 |
| Rolling resistance (index) | 100 | 104 | 107 | 108 | 107 | 106 |
| Wear resistance (index) | 100 | 94 | 102 | 105 | 101 | 97 |

*1: made by Nippon Silica Kogyo K.K.
*2: made by PPG Industries, Inc., DBA before treatment: 295, Apparent density before treatment: 310

*3: $A \text{ (hydrophobization ratio)} = 100 - \dfrac{\text{DBA after treatment}}{\text{DBA before treatment}} \times 100$

*4: made by Japan Synthetic Rubber Co., Ltd.
*5: made by Degussa in Germany bis-(3-trimethoxysilylpropyl)tetrasulfide
*6: made by The Shin-Etsu Chemical Co., Ltd. γ-mercaptopropyl trimethoxysilane
*7: N-phenyl-N'-isopropyl-p-phenylenediamine
*8: N-oxydiethylene-2-benzothiazole sulfenamide

TABLE 6

|  | Comparative Example 1 | Comparative Example 11 | Example 20 | Example 21 | Example 22 | Comparative Example 12 |
|---|---|---|---|---|---|---|
| Silica | Nipsil AQ *1 | Zeosil 175MP *2 | Zeosil 175MP *2 | Zeosil 175MP *2 | Zeosil 175MP *2 | Zeosil 175MP *2 |
| Treating agent |  |  | hexamethyl disilazane |  |  |  |
| Amount of treating agent (g/100 g silica) | 0 | 0.5 | 1 | 3 | 10 | 14 |
| DBA adsorption (mmol/kg) | 286 | 265 | 244 | 200 | 109 | 91 |
| A *3 | — | 10 | 17 | 32 | 63 | 69 |
| Apparent density (g/l) | 268 | 230 | 228 | 225 | 220 | 224 |
| SBR1500 *4 | 65 | 65 | 65 | 65 | 65 | 65 |
| NR | 35 | 35 | 35 | 35 | 35 | 35 |
| Compounding amount of silica | 60 | 60 | 60 | 60 | 60 | 60 |
| Coupling agent Si69 *5 | 6 | — | — | — | — | — |
| Coupling agent KBM803 *6 | — | 1.2 | 1.2 | 1.2 | 1.2 | 1.2 |
| Zinc oxide | 3 | 3 | 3 | 3 | 3 | 3 |
| Antioxidant *7 | 1 | 1 | 1 | 1 | 1 | 1 |
| Vulcanization accelerator *8 | 1.5 | 1.5 | 1.5 | 1.5 | 1.5 | 1.5 |
| Sulfur | 1.5 | 1.5 | 1.5 | 1.5 | 1.5 | 1.5 |
| Rolling resistance (index) | 100 | 104 | 107 | 108 | 107 | 104 |
| Wear resistance (index) | 100 | 93 | 100 | 104 | 102 | 97 |

*1: made by Nippon Silica Kogyo K.K.
*2: made by RHONE-POULENC DBA before treatment: 294, Apparent density before treatment: 230

*3: $A \text{ (hydrophobization ratio)} = 100 - \dfrac{\text{DBA after treatment}}{\text{DBA before treatment}} \times 100$

*4: made by Japan Synthetic Rubber Co., Ltd.
*5: made by Degussa in Germany bis-(3-trimethoxysilylpropyl)tetrasulfide
*6: made by The Shin-Etsu Chemical Co., Ltd. γ-mercaptopropyl trimethoxysilane
*7: N-phenyl-N'-isopropyl-p-phenylenediamine
*8: N-oxydiethylene-2-benzothiazole sulfenamide

TABLE 7

| | Comparative Example 1 | Comparative Example 13 | Example 23 | Example 24 | Example 25 | Comparative Example 14 |
|---|---|---|---|---|---|---|
| Silica | Nipsil AQ *1 | ULTRASIL VN3GR *2 | ULTRASIL VN3GR *2 | ULTRASIL VN3GR *2 | ULTRASIL VN3GR *2 | ULTRASIL VN3GR *2 |
| Treating agent | | | hexamethyl disilazane | | | |
| Amount of treating agent (g/100 g silica) | 0 | 0.5 | 1.0 | 3 | 10 | 14 |
| DBA adsorption (mmol/kg) | 286 | 230 | 220 | 166 | 102 | 86 |
| A *3 | — | 14 | 18 | 38 | 62 | 68 |
| Apparent density (g/l) | 268 | 332 | 330 | 324 | 320 | 315 |
| SBR1500 *4 | 65 | 65 | 65 | 65 | 65 | 65 |
| NR | 35 | 35 | 35 | 35 | 35 | 35 |
| Compounding amount of silica | 60 | 60 | 60 | 60 | 60 | 60 |
| Coupling agent Si69 *5 | 6 | — | — | — | — | — |
| Coupling agent KBM803 *6 | — | 1.2 | 1.2 | 1.2 | 1.2 | 1.2 |
| Zinc oxide | 3 | 3 | 3 | 3 | 3 | 3 |
| Antioxidant *7 | 1 | 1 | 1 | 1 | 1 | 1 |
| Vulcanization accelerator *8 | 1.5 | 1.5 | 1.5 | 1.5 | 1.5 | 1.5 |
| Sulfur | 1.5 | 1.5 | 1.5 | 1.5 | 1.5 | 1.5 |
| Rolling resistance (index) | 100 | 104 | 106 | 108 | 108 | 106 |
| Wear resistance (index) | 100 | 94 | 101 | 104 | 100 | 96 |

*1: made by Nippon Silica Kogyo K.K.
*2: made by Degussa AG DBA before treatment: 268, Apparent density before treatment: 345

*3: A (hydrophobization ratio) = $100 - \dfrac{\text{DBA after treatment}}{\text{DBA before treatment}} \times 100$

*4: made by Japan Synthetic Rubber Co., Ltd.
*5: made by Degussa in Germany bis-(3-trimethoxysilylpropyl)tetrasulfide
*6: made by The Shin-Etsu Chemical Co., Ltd. γ-mercaptopropyl trimethoxysilane
*7: N-phenyl-N'-isopropyi-p-phenylenediamine
*8: N-oxydiethylene-2-benzothiazole sulfenamide

TABLE 8

| | Comparative Example 1 | Comparative Example 15 | Example 26 | Example 27 | Example 28 | Comparative Example 16 |
|---|---|---|---|---|---|---|
| Silica | Nipsil AQ *1 | RP1165MP *2 | RP1165MP *2 | RP1165MP *2 | RP1165MP *2 | RP1165MP *2 |
| Treating agent | | | hexamethyl disilazane | | | |
| Amount of treating agent (g/100 g silica) | 0 | 0.5 | 1 | 3 | 10 | 15 |
| DBA adsorption (mmol/kg) | 286 | 272 | 254 | 199 | 121 | 97 |
| A *3 | — | 10 | 16 | 34 | 60 | 68 |
| Apparent density (g/l) | 268 | 232 | 230 | 224 | 225 | 220 |
| SBR1500 *4 | 65 | 65 | 65 | 65 | 65 | 65 |
| NR | 35 | 35 | 35 | 35 | 35 | 35 |
| Compounding amount of silica | 60 | 60 | 60 | 60 | 60 | 60 |
| Coupling agent Si69 *5 | 6 | — | — | — | — | — |
| Coupling agent KBM803 *6 | — | 1.2 | 1.2 | 1.2 | 1.2 | 1.2 |
| Zinc oxide | 3 | 3 | 3 | 3 | 3 | 3 |
| Antioxidant *7 | 1 | 1 | 1 | 1 | 1 | 1 |
| Vulcanization accelerator *8 | 1.5 | 1.5 | 1.5 | 1.5 | 1.5 | 1.5 |
| Sulfur | 1.5 | 1.5 | 1.5 | 1.5 | 1.5 | 1.5 |
| Rolling resistance (index) | 100 | 102 | 103 | 105 | 105 | 104 |
| Wear resistance (index) | 100 | 95 | 100 | 106 | 101 | 97 |

*1: made by Nippon Silica Kogyo K.K.
*2: made by RHONE-POULENC DBA before treatment: 302, Apparent density before treatment: 250

*3: A (hydrophobization ratio) = $100 - \dfrac{\text{DBA after treatment}}{\text{DBA before treatment}} \times 100$

*4: made by Japan Synthetic Rubber Co., Ltd.
*5: made by Degussa in Germany bis-(3-trimethoxysilylpropyl)tetrasulfide
*6: made by The Shin-Etsu Chemical Co., Ltd. γ-mercaptopropyl trimethoxysilane
*7: N-phenyl-N'-isopropyl-p-phenylenediamine
*8: N-oxydiethylene-2-benzothiazole sulfenamide

TABLE 9

|  | Comparative Example 1 | Comparative Example 17 | Example 29 | Example 30 | Example 31 | Comparative Example 18 |
|---|---|---|---|---|---|---|
| Silica | Nipsil AQ *1 | BV3370GR *2 | BV3370GR *2 | BV3370GR *2 | BV3370GR *2 | BV3370GR *2 |
| Treating agent |  | hexamethyl disilazane | | | | |
| Amount of treating agent (g/100 g silica) | 0 | 0.5 | 1 | 3 | 10 | 15 |
| DBA adsorption (mmol/kg) | 286 | 268 | 250 | 195 | 119 | 98 |
| A *3 | — | 12 | 18 | 36 | 61 | 68 |
| Apparent density (g/l) | 268 | 260 | 252 | 255 | 250 | 245 |
| SBR1500 *4 | 65 | 65 | 65 | 65 | 65 | 65 |
| NR | 35 | 35 | 35 | 35 | 35 | 35 |
| Compounding amount of silica | 60 | 60 | 60 | 60 | 60 | 60 |
| Coupling agent Si69 *5 | 6 | — | — | — | — | — |
| Coupling agent KBM803 *6 | — | 1.2 | 1.2 | 1.2 | 1.2 | 1.2 |
| Zinc oxide | 3 | 3 | 3 | 3 | 3 | 3 |
| Antioxidant *7 | 1 | 1 | 1 | 1 | 1 | 1 |
| Vulcanization accelerator *8 | 1.5 | 1.5 | 1.5 | 1.5 | 1.5 | 1.5 |
| Sulfur | 1.5 | 1.5 | 1.5 | 1.5 | 1.5 | 1.5 |
| Rolling resistance (index) | 100 | 103 | 104 | 107 | 106 | 104 |
| Wear resistance (index) | 100 | 94 | 101 | 105 | 100 | 95 |

*1: made by Nippon Silica Kogyo K.K.
*2: made by Degussa AG DBA before treatment: 305, Apparent density before treatment: 288

*3: $A \text{ (hydrophobization ratio)} = 100 - \dfrac{\text{DBA after treatment}}{\text{DBA before treatment}} \times 100$

*4: made by Japan Synthetic Rubber Co., Ltd.
*5: made by Degussa in Germany bis-(3-trimethoxysilylpropyl)tetrasulfide
*6: made by The Shin-Etsu Chemical Co., Ltd. γ-mercaptopropyl trimethoxysilane
*7: N-phenyl-N'-isopropyl-p-phenylenediamine
*8: N-oxydiethylene-2-benzothiazole sulfenamide As mentioned above, according to the invention, the low rolling resistance and the wear resistance can simultaneously be established by using the partially hydrophobizated silica in the rubber composition for the tire tread to largely improve the dispersion of the silica into rubber without degrading the reinforcing property to rubber.

What is claimed is:

1. A pneumatic tire comprising a tread, said tread being made from a rubber composition comprising natural rubber and/or synthetic diene rubber and 10–85 parts by weight of a partially hydrophobizated silica based on 100 parts by weight of the natural rubber and/or synthetic diene rubber wherein the rubber composition is obtained by subjecting a precipitated silica to a surface treatment with an organosilicon compound so as to satisfy a hydrophobization ratio (A) of 15–65% represented by the following equation and an apparent density of 200–350 g/l, then dispersing the partially hydrophobizated silica in the natural rubber and/or synthetic diene rubber:

$$A = 100 - (DBA/DBA') \times 100$$

wherein DBA is a di-n-butylamine adsorption of silica after surface treatment and DBA' is a di-n-butylamine adsorption of silica before surface treatment.

2. A pneumatic tire according to claim 1, wherein the rubber composition further containing not more than 80 parts by weight, based on 100 parts by weight of the rubber ingredient, of carbon black as a reinforcing filler.

3. A pneumatic tire according to claim 2, wherein the carbon black has a dibutylphthalate (DBP) oil absorption satisfying the following equation:

$$\text{DBP oil absorption} \geq 0.19 \times N_2SA + 90$$

wherein $N_2SA$ is a specific surface area of nitrogen adsorption of carbon black.

4. A pneumatic tire according to claim 1, wherein the organosilicon compound is at least one substance selected from the group consisting of compounds represented by the following general formulae (1)–(5) and low molecular weight cyclic polysiloxane:

  (1)
  (2)
  (3)
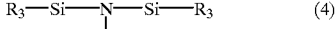  (4)

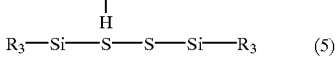  (5)

wherein n is an integer of 1–3, and R is a straight or branched chain, saturated or unsaturated, aromatic or alicyclic hydrocarbon group.

5. A pneumatic tire according to claim 1, wherein the rubber composition further contains 1–15% by weight of a silane coupling agent based on the weight of silica.

6. A pneumatic tire according to claim 5, wherein the silane coupling agent is at least one compound selected from the compounds represented by the following general formulae (6)–(9):

  (6)
  (7)
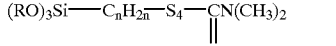  (8)

  (9)

wherein R is an alkyl group having a carbon number of 1–3, n is an integer of 1–8, m is an integer of 1–6, and X is a mercapto group or an amino group.

* * * * *